United States Patent
Guy

(10) Patent No.: US 8,720,481 B2
(45) Date of Patent: May 13, 2014

(54) FLUID LEAK DETECTION AND SHUTDOWN APPARATUS

(76) Inventor: Kevin Duane Guy, Yuma, CO (US)

( * ) Notice: Subject to any disclaimer, the term of this patent is extended or adjusted under 35 U.S.C. 154(b) by 82 days.

(21) Appl. No.: 13/272,219

(22) Filed: Oct. 13, 2011

(65) Prior Publication Data

US 2013/0092242 A1 Apr. 18, 2013

(51) Int. Cl.
F16K 31/02 (2006.01)

(52) U.S. Cl.
USPC ............... 137/486; 137/487.5; 137/625.14; 137/599.01; 137/601.2

(58) Field of Classification Search
USPC ............... 137/486, 487.5, 624.11, 624.12, 137/624.13, 624.14, 552.7, 511, 2, 599.01, 137/599.13, 601.2, 601.18
See application file for complete search history.

(56) References Cited

U.S. PATENT DOCUMENTS

| | | | | |
|---|---|---|---|---|
| 3,921,899 | A * | 11/1975 | Hamilton | 236/9 A |
| 4,299,698 | A * | 11/1981 | Rak et al. | 210/96.1 |
| 4,589,435 | A * | 5/1986 | Aldrich | 137/102 |
| 5,056,554 | A * | 10/1991 | White | 137/486 |
| 5,190,069 | A * | 3/1993 | Richards | 137/312 |
| 5,287,884 | A * | 2/1994 | Cohen | 137/486 |
| 5,377,529 | A * | 1/1995 | Boyd | 73/40 |
| 5,415,033 | A | 5/1995 | Maresca, Jr. et al. | |
| 5,568,825 | A * | 10/1996 | Faulk | 137/624.11 |
| 5,637,789 | A * | 6/1997 | Lawson | 73/40.5 R |
| 6,164,319 | A * | 12/2000 | Cochran et al. | 137/487.5 |
| 6,209,576 | B1 * | 4/2001 | Davis | 137/487.5 |
| 6,236,553 | B1 * | 5/2001 | Widell | 361/189 |
| 6,812,848 | B2 * | 11/2004 | Candela | 340/605 |
| 6,945,274 | B1 | 9/2005 | Davis | |
| 7,283,913 | B2 * | 10/2007 | Garnaes | 702/51 |
| 7,574,896 | B1 | 8/2009 | Cooper | |
| 7,849,890 | B2 | 12/2010 | Jones | |
| 7,900,647 | B2 * | 3/2011 | Tornay | 137/15.11 |
| 7,900,650 | B1 | 3/2011 | Wilson | |
| 2010/0212748 | A1 * | 8/2010 | Davidoff | 137/10 |

* cited by examiner

Primary Examiner — John K Fristoe, Jr.
Assistant Examiner — Minh Le
(74) Attorney, Agent, or Firm — Roger A. Jackson

(57) ABSTRACT

An apparatus and method for a fluid leak detection and shutdown for a fluid distribution system having a total system flow rate. The apparatus includes a solenoid shutoff valve having a normally open state and an activated closed state with a flow capacity matched to the total fluid distribution system flow rate. The apparatus also has a primary fluid flow line and a smaller capacity secondary fluid flow line. The apparatus includes a flow sensor in fluid communication with the secondary fluid flow line, wherein the flow sensor has a perceptible output and a flow rate capacity less than the solenoid shutoff flow capacity. Operationally, the flow sensor receives a portion of the solenoid shutoff valve flow capacity in priority over the primary fluid flow line, allowing the flow sensor to detect minimal flow rates and using the perceptible output to activate the solenoid shutoff valve into the closed state.

5 Claims, 7 Drawing Sheets

FLUID LEAK DETECTION AND SHUTDOWN APPARATUS

RELATED APPLICATIONS

There are no related applications.

TECHNICAL FIELD

The present invention relates generally to a fluid leak detection and shutdown apparatus. More specifically, the present invention relates to an electro-mechanical based liquid leak detection and shutdown apparatus for detecting the presence of a selected amount of liquid flow in a particular location in a liquid line, for the purpose of initiating a sequence of actions that is intended to shutdown the upstream liquid flow of liquid to prevent further damage to an environment that would be susceptible to damage from the unintended liquid flow.

BACKGROUND OF INVENTION

Typically the ideal location for first detecting a leak is adjacent to the source of the leak for the purpose of not only stopping the leaks as soon as possible to minimize damage, but to pinpoint the actual source of the leak, however, usually the leak source is in an difficult to access location or area, thus placement of an automated leak detection apparatus in its ideal location will hasten the timeliness of a useful perceptible output from the leak detection apparatus to minimize damage to either or both the machine that may be malfunctioning via leaking or surrounding structure affected by the leak. However, as a practical matter, having an automated leak detection apparatus everywhere a leak may occur is not realistic due to the multitude of potential leak locations causing undue complication and cost.

Wherein normally without the presence of any type of leak detection apparatus, a small liquid leakage from a machine, say for instance hidden underneath a large heavy ice making machine (that is rarely moved) that has a low volumetric flow rate leak or in other words a seeping leak can cause significant damage to the machine and/or surrounding adjacent structure prior to being detected. Unfortunately, the ice machine will continue to work perfectly during its small leakage phase thus not alerting a user to the presence of the slight leakage condition, at least until the surrounding structure suffers significant damage, wherein the leak would more likely be detected.

Thus, this situation can continue for quite some time until extensive damage has occurred in the hidden machine portions and/or support structure, wherein at some later in time point the structural damage eventually becomes obvious, wherein the structural damage from the liquid seepage is more excessive than it should be. Thus, the result is that the support structure suffers additional damage that is hidden from view in addition to the leaked fluid, typically water or even worse a fluid that is toxic or chemical in nature that could risk further safety, electrical risk, or environmental harm. Unfortunately, water damage can most likely occur one the office or home is vacant wherein a frozen pipe can be burst shutoff valves can fail to say toilet tanks or for instance refrigerator ice makers can have line ruptures in addition to dishwashers, and items such as broken hoses to washing machines. The typical damage would include damage to wallboard, wallpaper, paint, electrical fixtures and wiring, carpeting and padding, vinyl flooring, subflooring, or building structure, plus furniture and other household items. In addition, items such as financial records, photos, and other irreplaceable items can be destroyed beyond retrieval or repair. Further, later forming issues can include hazardous molds and the like that will require even more costly and difficult cleanups.

Thus, the key issues for the leak detection apparatus involve, small space or size requirements for the apparatus, as the specific placement location for the apparatus may be in a confined area with difficult accessibility, a further issue in the leak detection apparatus is the sensitivity of generating a perceptible output from a very low liquid leakage flow rate, usually in the range of about one-third (⅓) of a gallon per minute to detect a leak prior to a significant damage occurring, i.e. catching the leak as soon as possible. Another issue for the leak detection apparatus is to ideally have a single leak detection apparatus able to cover a multitude of potential leak points for ease of installation and to reduce cost, and in addition for the leak detection apparatus to automatically shutdown the root source of the leakage based upon the detection of leakage to minimize damage either to machines, equipment, or the surrounding structure or environment from leakage damage.

Looking at the prior art in this area, in U.S. Pat. No. 7,900,650 to Wilson disclosed is a system that provides for the remote control shutoff of the main water supply to a structure in an unattended manner. The Wilson system comprises a solenoid activated shutoff valve typically mounted immediately downstream of a main water shutoff valve and a locking enclosure containing a remote control switch and audible alarm unit. A manual bypass valve in Wilson is provided as an override should it be required. Also in Wilson, because the system requires electricity to operate, a general power failure will automatically shut off of the water supply. Further, activation of the Wilson system is accomplished using a remote control to control the system from a distance. Note that there is no teaching of a flow meter in a bypass line disclosed in Wilson in conjunction with the solenoid activated shutoff valve, a bypass line is taught, however, only with a manual valve. Wilson does not also teach the automated shutting off of the water supply in the event of a leak occurring when there is no one around the house or water system, as Wilson requires the manual selectively shutting off of the water system, suggesting that the water system be completely shut off when the homeowner is absent, however, in this case the homeowner could just manually shut off their main water valve without the Wilson system. Also when a homeowner is absent, Wilson ignores the fact that a hot water heater needs a continuous feed of water even without use, unless Wilson advocates shutting down the hot water heater also, which was not disclosed.

Continuing in the prior art, in U.S. Pat. No. 6,945,274 to Davis being similar to Wilson, wherein Davis discloses a modular water supply shut off and by manual valve pass system that can be installed in a standard water supply line and used to prevent water flow through the supply line except when the system is activated. The system in Davis includes a modular unit having main fluid flow line provided with a remotely actuated valve and the manual bypass fluid flow line provided with a manually operated valve for cases of when the remotely actuated valve fails. The system in Davis also has a control unit that includes a timing mechanism that be operated to actuate the remotely actuated valve and allow water to flow through the main fluid flow line for a manually selected period of time determined by the timing mechanism. A momentary switch in Davis is coupled to the control unit and used to actuate the timing mechanism. Thus, Davis is design to facilitate the water main valve to be "on" or open for the selected amount of time and then to automatically close the main valve when the selected time has elapsed, say for instance in a vacation home, also included is a reset momentary switch which can re-start the timer. Davis does not teach any form of leak detection or water system automatic shut off in the event of a water system leak, as there is no measure of flow rate with a flow meter.

Further, in the prior art looking at U.S. Pat. No. 7,574,896 to Cooper disclosed is a leak detection apparatus for detecting and controlling a leak in a pressurized piping system, which comprises: control logic; both of one and only one flow detector in communication with said logic, and one and only one pressure detector in communication with said logic; and a control valve in communication with said logic; wherein at least one of the following additional features is also provided: the control logic, both of one and only one flow detector and one and only one pressure detector, and the control valve are in close proximity to one another; and the control valve has a baseline condition of being shut off. In Cooper, the pressure detector works via detecting pressure degradation and/or flow rate increase, however, pressure detection to monitor low leakage situations would be problematic, as with slow leaks, pressure drop may not even occur as the municipal water supply will maintain a constant feed pressure of water into the system unless the flow rate is excessively high causing a water system pressure drop, the only instance wherein system pressure drops would detect small leakage is when the system does not have a pressure water or liquid feed, such as a closed off system, however, the teaching is for a municipal constant water pressure feed system, see column 6, lines 10-15, thus water pressure sensing would only detect relatively high flow rates. In operation in Cooper, the flow detector is used for sensing user demand, in which case there is user demand, then the main valve remains open until user demand ceases, at which time flow rate detection and pressure drop detection would activate closing of the main valve, although teaching of how user demand is really sensed is not present-however, it would typically involve some form of electronic sensor at each water use appliance, which would be complicated and costly, Cooper does mention using the timer for a time window in which user demand is assumed thus negating when flow or pressure sensing would activate closing the main valve, however, this could facilitate a leak being allowed to proceed (i.e. no main valve shut off) if the user demand time window is longer. Note that the flow detector in Cooper must be sized and configured to handle the full flow rate of the system, which would limit the low flow rate detection limit, especially in larger flow rate systems, as the flow detector is not in a bypass loop-but is in the main flow loop.

Next, in the prior art, in looking at U.S. Pat. No. 5,415,033 to Maresca, Jr., et al. disclosed is a apparatus for detection of leaks in pressurized pipelines which utilizes a large pressure vessel and a small measurement vessel. The measurement vessel in Maresca, Jr. magnifies level changes during leak detection tests due to volume change amplification from the small measurement vessel, wherein the apparatus is connected to a pipeline through the measurement vessel. The entire system in Maresca Jr. can be filled with liquid from the pipeline by opening a valve between the measurement and pressure vessels. Leak detection tests in Maresca Jr. are conducted by measuring changes in volume with the measurement vessel over time while the pressure over the liquid in the pressure vessel and measurement vessel is maintained approximately constant and during tests, liquid communication between the measurement vessel and pressure vessel is prevented by closing the valve between them, but vapor communication between the vessels is permitted, thus measurement by volume is done not by pressure-wherein the pressure is maintained at a constant level by large pressure vessel to eliminate pressure effects on the volume measurement due to the typical hydrocarbon having high sensitivity to environmental conditions that cause variance in vapor pressure of the liquid in the system being measured for leakage. Note that there is no need for a flow meter in Maresca Jr., which would be considered undesirable due to the low leakage flow rates required to be detected being around 0.1 gallon per hour.

Further, in the prior art in U.S. Pat. No. 7,849,890 to Jones disclosed is an assembly, comprising: a sealed housing; at least one moisture-sensitive component disposed of within the sealed housing. Jones is designed for electronic equipment that is disposed within the sealed housing for protection from the elements, wherein it is desired to detect a buildup of moisture within the housing. The housing in Jones has a first sensor element operable to generate a first signal in response to moisture in a first state being present at a first predetermined level within the sealed housing; also a first valve element coupled to the housing and, in response to the first signal, operable to enable at least a portion of the moisture to exit the housing at the first valve element. Further in Jones, a second sensor element is operable to generate a second signal in response to moisture in a second state being present at a second predetermined level within the sealed housing; a third sensor element operable to sense that a pressure outside the housing is less than a pressure within the housing; and a second valve element coupled to the housing. In response to the second signal in Jones, it is operable to enable at least a portion of the moisture to exit the sealed housing at the second valve element if and only if the pressure level inside the sealed housing is greater than a pressure level outside the sealed housing. Note that in Jones there is no flow meter, as Jones basically utilizes a float switch (moisture-sensitive component) and valve that senses a certain level of an amount of static moisture accumulation in the housing-sends a signal from the switch and the valve facilitates the moisture level buildup to exit the housing.

There remains a need for a fluid leak detection and shutdown apparatus that is simple to install, is self contained in not needing remotely mounted sensors, utilizes a flow switch bypass loop-allowing for a smaller (lower flow rate) and more accurate flow sensor for lower flow rates that is less expensive, and a time delay to main valve actuation to the closed position thus accommodating normal system low flow but temporary flow items such as refrigerator ice makers, evaporative coolers, hot water heater refills, and the like, such as to not cause unnecessary shut-offs of the main valve actuation. A single fluid leak detection and shutdown apparatus should be able to detect any leak within a system from a central inlet location within the system and after the proper conditions have been satisfied automatically shut down the main valve actuation to the system to stop the leakage and thereby the subsequent damage to the equipment and environment.

SUMMARY OF INVENTION

Broadly, the present invention is of a fluid leak detection and shutdown apparatus for a fluid distribution system having a total fluid distribution system flow rate, the fluid distribution system having an inlet and an outlet. The fluid leak detection and shutdown apparatus including a solenoid shutoff valve having a longitudinal axis, the solenoid shutoff valve having a flow capacity substantially matched to the total fluid distribution system flow rate, and the solenoid shutoff valve is adapted to be in fluid communication downstream from the fluid distribution system inlet. The solenoid shutoff valve having an open operational state that allows fluid flow therethrough and a closed operational state that substantially precludes fluid flow therethrough, also the solenoid shutoff valve having a default position of being in the open operational state and the solenoid shutoff valve having an activated position of being in the closed operational state.

Also included in the fluid leak detection and shutdown apparatus is a primary fluid flow line having a lengthwise axis, the primary fluid flow line is in downstream fluid communication with the solenoid shutoff valve, the primary fluid flow line also being in upstream fluid communication with the fluid distribution system outlet. The primary fluid flow line having a primary fluid flow line cross sectional flow area associated with a primary fluid flow rate, with the lengthwise axis being substantially perpendicular to the longitudinal axis. Further included in the fluid leak detection and shutdown apparatus is a secondary fluid flow line having a long axis, the secondary fluid flow line is in downstream fluid communication with the solenoid shutoff valve, the secondary fluid flow line also being in upstream fluid communication with the fluid distribution system outlet. The secondary fluid flow line having a secondary fluid flow line cross sectional flow area associated with a secondary fluid flow rate, wherein the secondary fluid flow line cross sectional flow area is less than the primary fluid flow line cross sectional flow area such that the secondary fluid flow rate is less than the primary fluid flow rate, the secondary fluid flow line long axis being co-axial to the longitudinal axis.

Yet further included in the fluid leak detection and shutdown apparatus is a flow sensor in fluid communication with the secondary fluid flow line, the flow sensor having a perceptible output, wherein the flow sensor has a flow sensing flow rate capacity that is less than the solenoid shutoff flow capacity. Wherein operationally the flow sensor receives a portion of the solenoid shutoff valve flow capacity in priority over the primary fluid flow line that receives a remaining portion of the solenoid shutoff valve flow capacity, thus allowing the flow sensor to detect minimal flow rates. Plus also included in the fluid leak detection and shutdown apparatus is a means for activating the solenoid shutoff valve based on the flow sensor perceptible output.

These and other objects of the present invention will become more readily appreciated and understood from a consideration of the following detailed description of the exemplary embodiments of the present invention when taken together with the accompanying drawings, in which;

REFERENCE NUMBERS IN DRAWINGS

Figure 1:
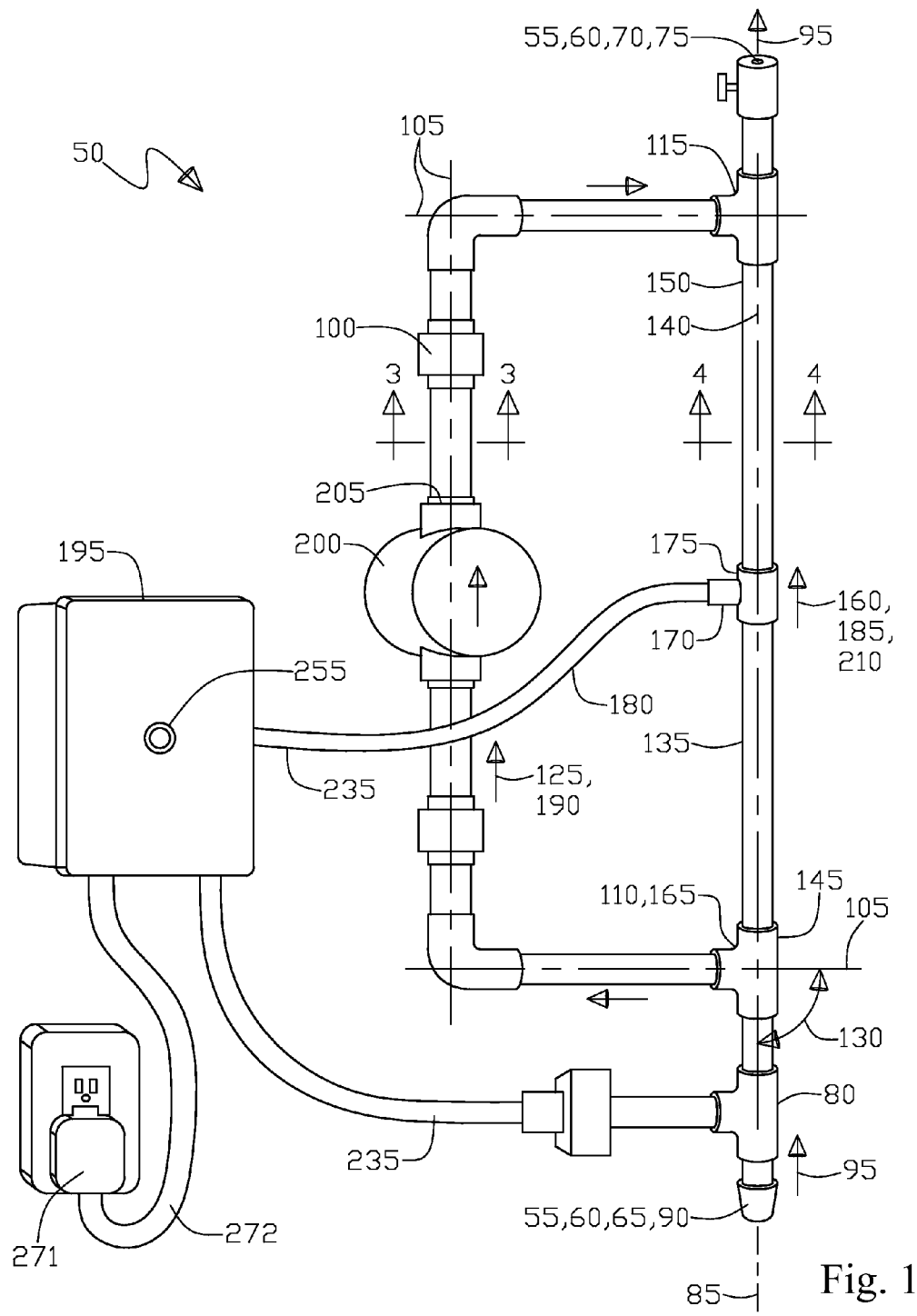
FIG. 1 shows a perspective view of the fluid leak detection and shutdown apparatus including the fluid distribution system, the solenoid shutdown valve, the primary fluid flow line, the secondary fluid flow line, the flow sensor, means for activating the solenoid shutoff valve, the check valve, and the electrical power supply.

50 Fluid leak detection and shutdown apparatus
55 Fluid distribution system
60 Total fluid distribution system flow rate
65 Inlet of fluid distribution system 55
70 Outlet of fluid distribution system 55
75 Article of the fluid distribution system that consumes a portion of the total fluid distribution system 55 flow rate 60
80 Solenoid shutdown valve
85 Longitudinal axis of solenoid shutdown valve 80
90 Solenoid shutdown valve adapted to be in fluid communication downstream from the inlet 65 of the fluid distribution system 55
95 Fluid flow
100 Primary fluid flow line
105 Lengthwise axis of the primary fluid flow line 100
110 Primary fluid flow line 100 in downstream fluid communication with the solenoid shutoff valve 80
115 Primary fluid flow line 100 in upstream fluid communication with the fluid distribution system 55 outlet 70
120 Cross sectional fluid flow area of the primary fluid flow line 100
121 Internal diameter of the primary fluid flow line 100
122 Outside diameter of the primary fluid flow line 100
125 Primary fluid flow rate
130 Substantially perpendicular relationship as between the lengthwise axis 105 and the longitudinal axis 85
135 Secondary fluid flow line
140 Long axis of the secondary fluid flow line 135
145 Secondary fluid flow line 135 in downstream fluid communication with the solenoid shutoff valve 80
150 Secondary fluid flow line 135 in upstream fluid communication with the fluid distribution system 55 outlet 70
155 Cross sectional fluid flow area of the secondary fluid flow line 135

Figure 7:
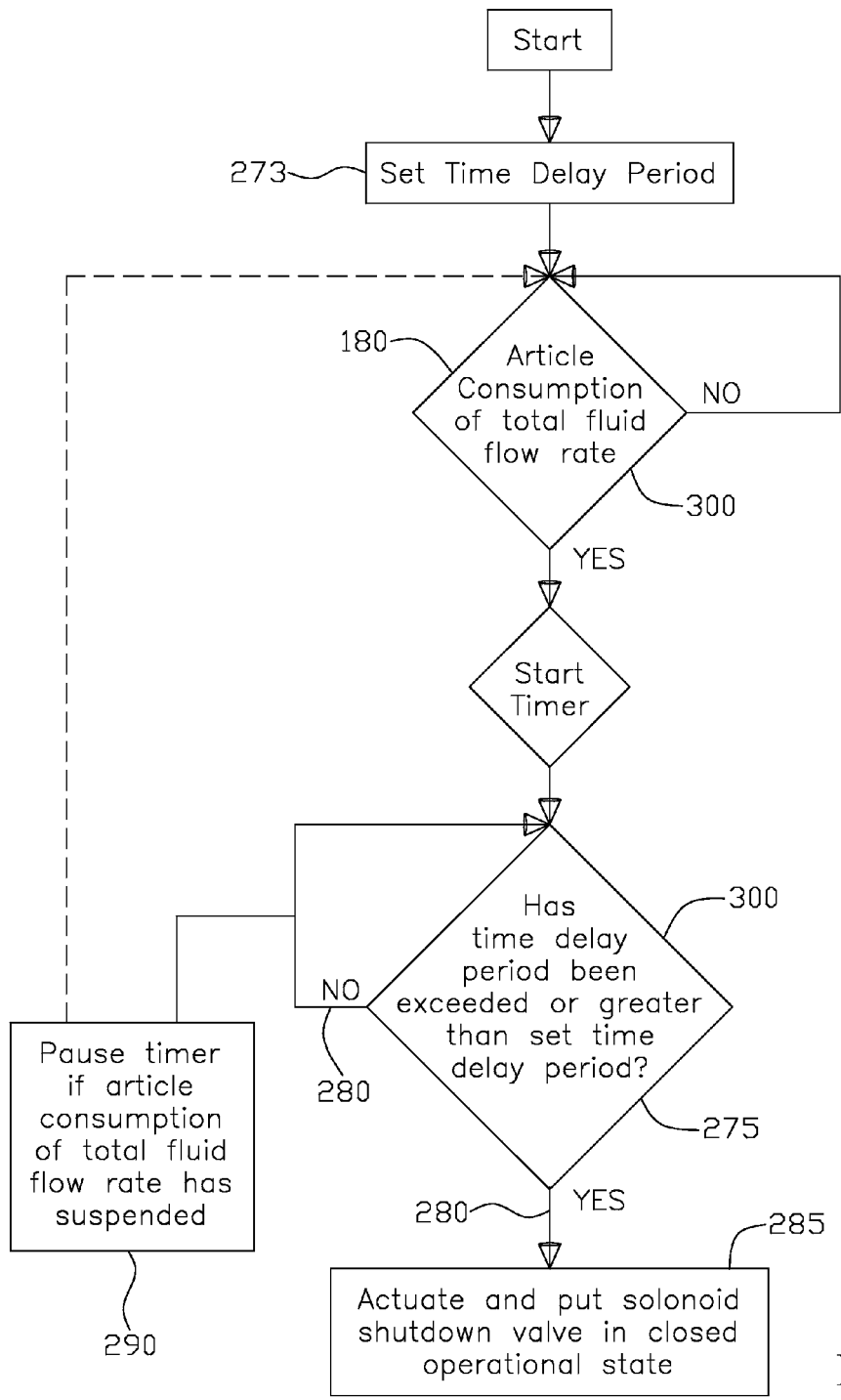
FIG. 7 shows a diagrammatic flow chart of the method of using the fluid leak detection and shutdown apparatus starting with the setting of the time delay period, measuring the article consumption of total fluid flow rate via the flow sensor, which starts the timer, wherein if the set time period has not been reached the solenoid shutoff valve is left in the open operational state or is paused if the flow sensor ceases to detect flow, until the set time delay period has elapsed at which time the solenoid shutoff valve is activated to place the solenoid shutoff valve in the closed operational state.

156 Internal diameter of the secondary fluid flow line 135
157 Outside diameter of the secondary fluid flow line 135
160 Secondary fluid flow rate
165 Coaxial relationship as between the long axis 140 and the longitudinal axis 85
170 Flow sensor
175 Flow sensor in fluid communication with the secondary fluid flow line 135
180 Perceptible output of the flow sensor 170
185 Flow sensor receiving a portion of the solenoid shutoff valve 80 flow capacity in priority over the primary fluid flow line 100
190 Primary fluid flow line receiving the remaining portion of the solenoid shutoff valve 80 flow capacity
195 Means for activating the solenoid shutoff valve 80 based on the flow sensor 170 perceptible output 180
200 Check valve
205 Check valve in fluid communication with the primary fluid flow line 100
210 Check valve allowing fluid flow from the solenoid shutoff valve 80 to the fluid distribution system 55 outlet 70
215 Check valve substantially preventing fluid flow from the fluid distribution system 55 outlet 70 to the solenoid shutoff valve 80
220 Check valve substantially preventing flow from the primary fluid flow line 100 to the secondary fluid flow line 135
225 Selectable time delay device
230 Switch for the selectable time delay device 225
235 Electrical communication as between the flow sensor 170, the selectable time delay 225, and the solenoid shutoff valve 80
240 Latching relay
245 Energized operational state of the latching relay 240
250 De-energized operational state of the latching relay 240
255 Selectable reset circuit
260 Normally open circuit operational state of the selectable reset circuit 255
265 Momentarily selectable closed circuit operational state of the selectable reset circuit 255
270 Setting the time delay period on the selectable time delay device 225
271 Electrical power supply
272 Communication of electrical power supply 271
273 Setting time delay period of the time delay device 225 on the flow chart FIG. 7
274 Electrical rectifier bridge of the electrical power supply 271
275 Time delay device 225 start based upon flow sensor 170 perceptible output 180 occurring
280 Is the time of the article 75 consumption of the total fluid flow rate 60 greater than the selected time delay period 270 or 273
285 Activate solenoid shutoff valve 80 into the closed operational state
290 Pause time delay device 225 if article 75 consumption of total fluid flow rate 60 has suspended
300 Re-start time delay device 225 if article 75 consumption of total fluid flow rate 60 has resumed

DETAILED DESCRIPTION

With initial reference to FIG. 1 shown is a FIG. 1 shown is a perspective view of the fluid leak detection and shutdown apparatus 50 including the fluid distribution system 55, the solenoid shutdown valve 80, the primary fluid flow line 100, the secondary fluid flow line 135, the flow sensor 170, means 195 for activating the solenoid shutoff valve 80, the check valve 200, and the electrical power supply 271. Further, FIG. 2 shows a perspective view of the fluid leak detection and shutdown apparatus 50 including the fluid distribution system 55, the solenoid shutdown valve 80, the primary fluid flow line 100, the secondary fluid flow line 135, the flow sensor 170, means 195 for activating the solenoid shutoff valve 80 that includes showing the selectable reset circuit 255, the selectable time delay device 225, and latching relay 240, further the check valve 200, and the electrical power supply 271 including the rectifier bridge 274 are shown.

Figure 2:
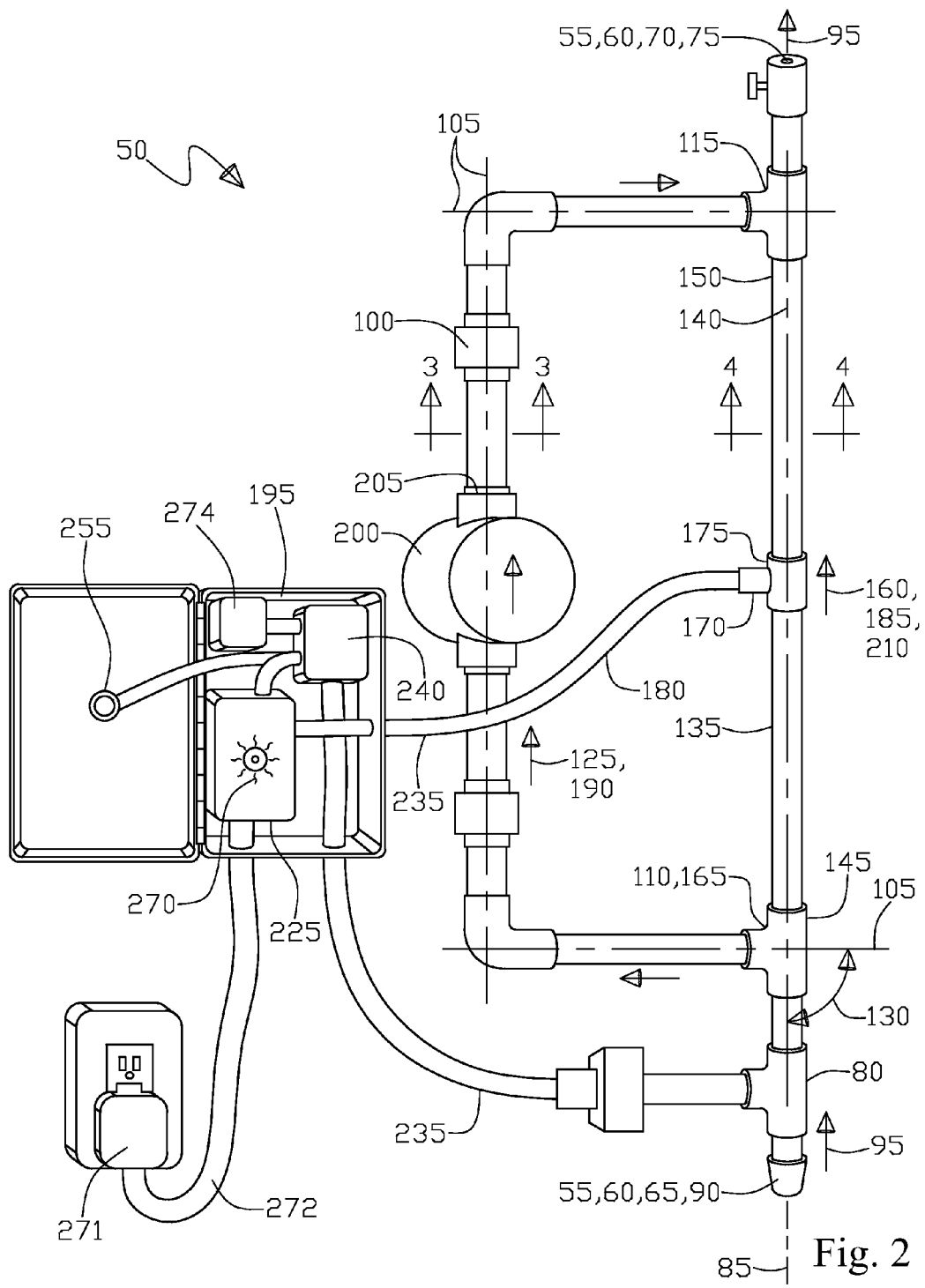
FIG. 2 shows a perspective view of the fluid leak detection and shutdown apparatus including the fluid distribution system, the solenoid shutdown valve, the primary fluid flow line, the secondary fluid flow line, the flow sensor, means for activating the solenoid shutoff valve that includes showing the selectable reset circuit, the selectable time delay device, and latching relay, further the check valve, and the electrical power supply including the rectifier bridge are shown.
Figure 3:
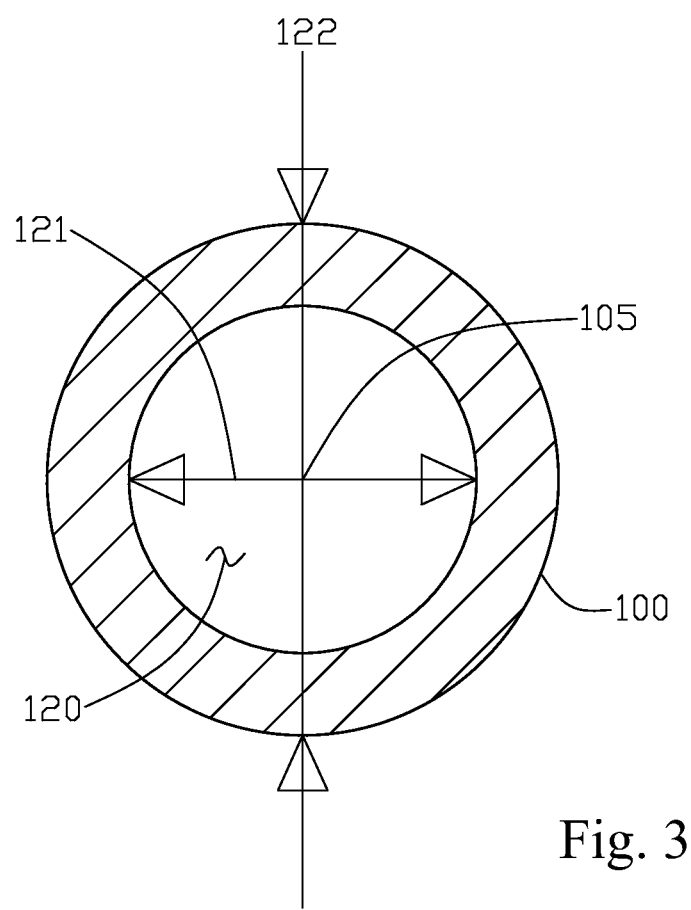
FIG. 3 shows the cross sectional view 3-3 from FIGS. 1 and 2, wherein the fluid flow area of the of the primary fluid flow line is shown including the internal diameter of the primary fluid flow line, the outside diameter of the primary fluid flow line, and where the lengthwise axis is positioned.
Figure 4:
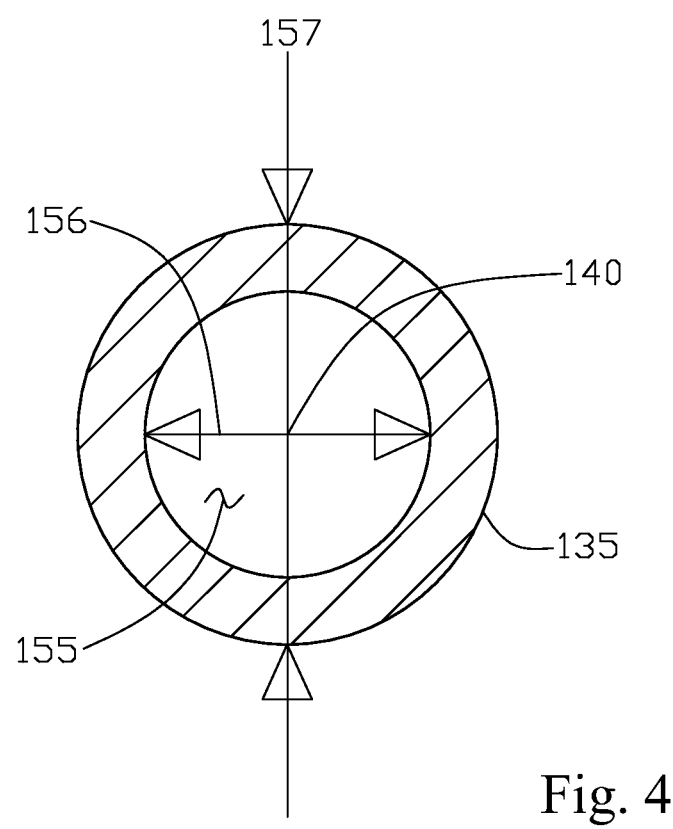
FIG. 4 shows the cross sectional view 4-4 from FIGS. 1 and 2, wherein the fluid flow area of the of the secondary fluid flow line is shown including the internal diameter of the secondary fluid flow line, the outside diameter of the secondary fluid flow line, and where the long axis is positioned.

Continuing, FIG. 3 shows the cross sectional view 3-3 from FIGS. 1 and 2, wherein the fluid flow area 120 of the of the primary fluid flow line 100 is shown including the internal diameter 121 of the primary fluid flow line 100, the outside diameter 122 of the primary fluid flow line 100, and where the lengthwise axis 105 is positioned in the primary fluid flow line 100. Next, FIG. 4 shows the cross sectional view 4-4 from FIGS. 1 and 2, wherein the fluid flow area 155 of the of the secondary fluid flow line 135 is shown including the internal diameter 156 of the secondary fluid flow line 135, the outside diameter 157 of the secondary fluid flow line 135, and where the long axis 140 is positioned in the secondary fluid flow line 135.

Figure 5:
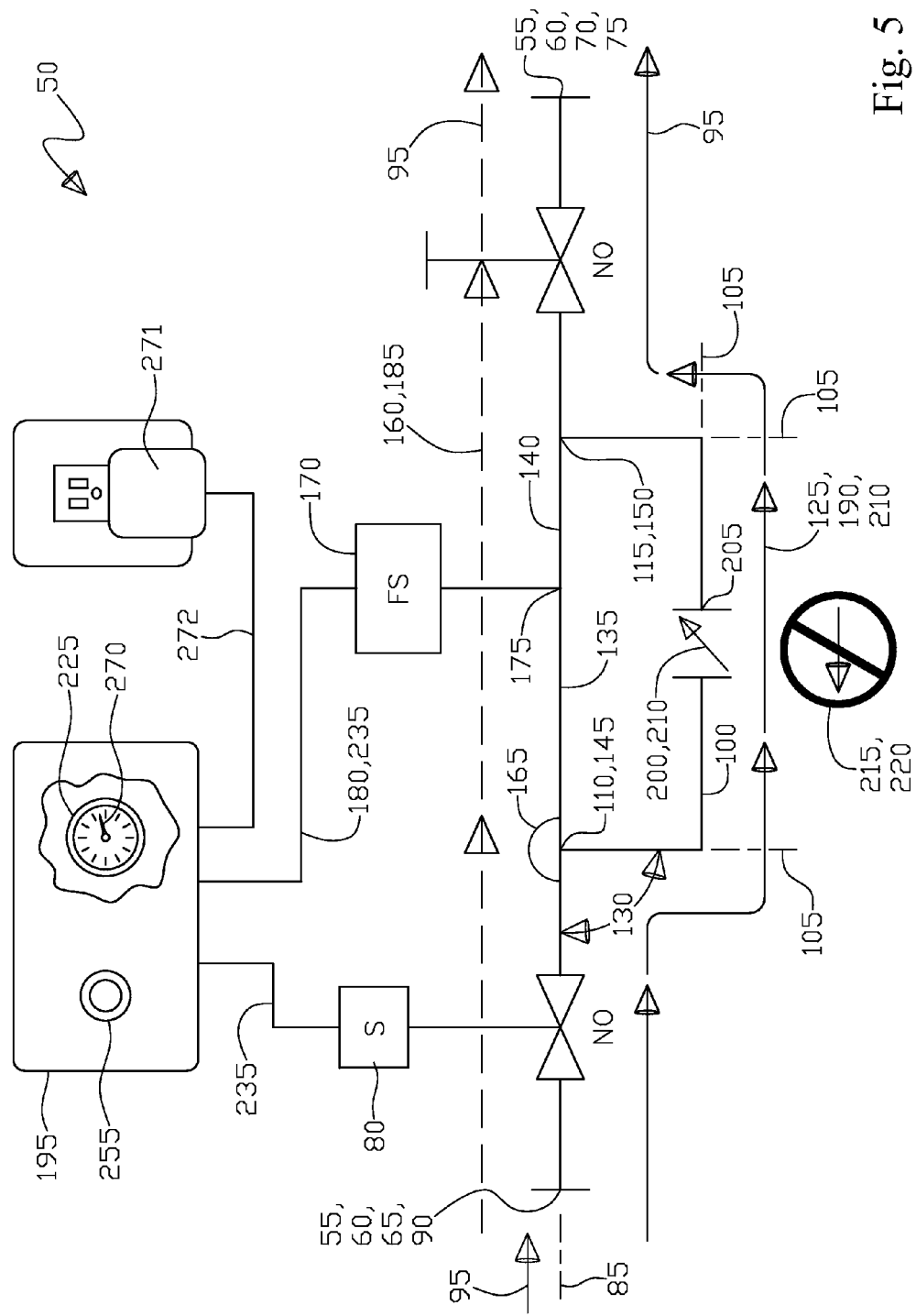
FIG. 5 shows a fluid flow schematic and electrical communication schematic of the fluid leak detection and shutdown apparatus including the fluid distribution system, the solenoid shutdown valve, the primary fluid flow line, the secondary fluid flow line, the flow sensor, means for activating the solenoid shutoff valve that includes showing the selectable reset circuit and the selectable time delay device, further the check valve, and the electrical power supply are shown.
Figure 6:
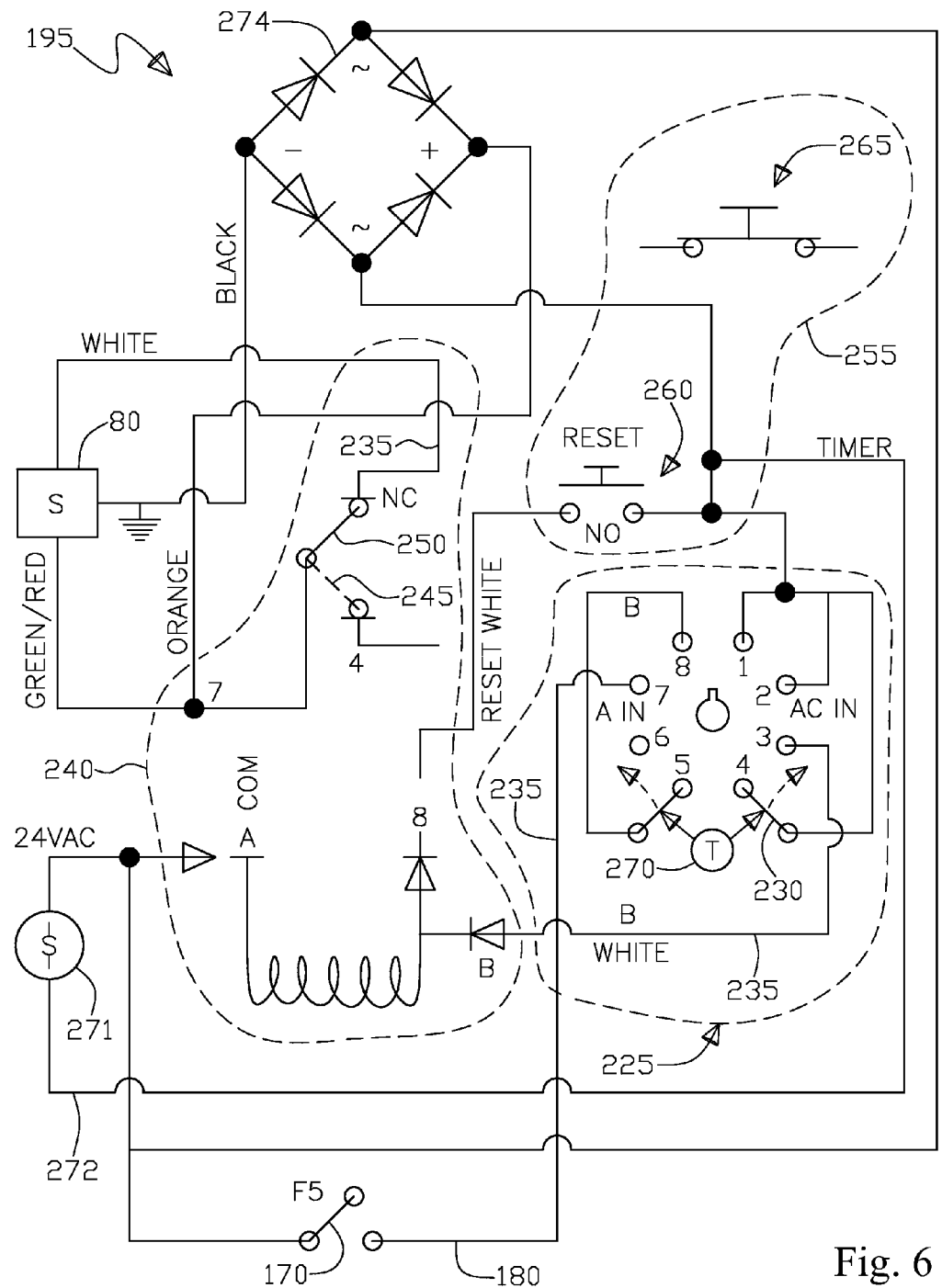
FIG. 6 shows an electrical schematic of the fluid leak detection and shutdown apparatus including the solenoid shutdown valve, the flow sensor, means for activating the solenoid shutoff valve that includes showing the selectable reset circuit, the selectable time delay device, and latching relay, further the electrical power supply including the rectifier bridge are shown.

Yet further, in FIG. 5 shown is a fluid flow schematic and electrical communication schematic of the fluid leak detection and shutdown apparatus 50 including the fluid distribution system 55, the solenoid shutdown valve 80, the primary fluid flow line 100, the secondary fluid flow line 135, the flow sensor 170, means 195 for activating the solenoid shutoff valve 80 that includes showing the selectable reset circuit 255 and the selectable time delay device 225, further the check valve 200, and the electrical power supply 271 are shown. Wherein the electrical power supply 271 is preferably a standard wall plug 110 VAC outlet transformer that converts to 24 VAC, also the power supply can include the rectifier bridge 274. Continuing, FIG. 6 shows an electrical schematic of the fluid leak detection and shutdown apparatus 50 including the solenoid shutdown valve 80, the flow sensor 170, means 195 for activating the solenoid shutoff valve 80 that includes showing the selectable reset circuit 255, the selectable time delay device 225, and latching relay 240, further the electrical power supply 271 including the rectifier bridge 274 are shown, wherein the rectifier bridge 274 is preferably a Fairchild model GBPC3502.

Next, FIG. 7 shows a diagrammatic flow chart of the method of using the fluid leak detection and shutdown apparatus 50 starting with the setting 273 of the time delay period, measuring the article 75 consumption of total fluid flow rate 60 via the flow sensor 170, which starts 275 the timer 225, wherein if the set time period has not been reached 280 the solenoid shutoff valve 80 is left in the open operational state or is paused 290 if the flow sensor 170 ceases to detect flow 180, until the set time delay period has elapsed 280 at which time the solenoid shutoff valve 80 is activated 285 to place the solenoid shutoff valve 80 in the closed operational state.

Broadly, the present invention of the fluid leak detection and shutdown apparatus 50 is for the fluid distribution system 55 having a total fluid distribution system flow rate 60, the fluid distribution system having an inlet 65 and an outlet 70 is disclosed, see in particular FIGS. 1, 2, and 5. The fluid leak detection and shutdown apparatus 50 includes a solenoid shutoff valve 80 having a longitudinal axis 85, the solenoid shutoff valve 80 having a flow capacity substantially matched to the total fluid distribution system 55 flow rate 60, the solenoid shutoff valve 80 is adapted 90 to be in fluid communication downstream from the fluid distribution system 55 inlet 65, again see FIGS. 1, 2, and 5.

The solenoid shutoff valve 80 having an open operational state that allows fluid flow 95 therethrough and a closed operational state that substantially precludes fluid flow 95 therethrough, the solenoid shutoff valve 80 having a default position of being in the open operational state (NO=normally open) and the solenoid shutoff valve 80 having an activated position of being in the closed operational state. The solenoid shut off valve 80 is preferably a Banjo brand that is a 24 VDC on/off type with an internal automatic fuse reset, or a suitable equivalent for the particular fluid distribution system 55 application of pressure, temperature, and type of fluid. A battery backup can be utilized to keep the solenoid shutoff valve 80 in its above described normal operation in the event of utility electrical power loss, wherein if the solenoid shutoff valve 80 losses electrical power it will stay in the open operational state.

Also included in the fluid leak detection and shutdown apparatus 50 is a primary fluid flow line 100 having a lengthwise axis 105, the primary fluid flow line 100 is in downstream fluid communication 110 with the solenoid shutoff valve 80, the primary fluid flow line 100 also being in upstream fluid communication 115 with the fluid distribution system 55 outlet 70, see FIGS. 1, 2, and 5. The primary fluid flow line 100 having a primary fluid flow line 100 cross sectional flow area 120 associated with a primary fluid flow rate 125, with the lengthwise axis 105 being substantially perpendicular 130 to the longitudinal axis 85, see FIGS. 1, 2, 3, and 5. The preferred cross sectional area 120 is about 0.3 inches squared based upon a ½" nominal schedule 40 pipe size with an internal diameter 121 of 0.622 inches and an outside diameter 122 of 0.840 inches, however, other pipe sizes could be employed as required.

Further included in the fluid leak detection and shutdown apparatus 50 is a secondary fluid flow line 135 having a long axis 140, the secondary fluid flow line 135 is in downstream fluid communication 145 with the solenoid shutoff valve 80, the secondary fluid flow line 135 also being in upstream fluid communication 150 with the fluid distribution system 55 outlet 70, see FIGS. 1, 2, and 5. The secondary fluid flow line 135 having a secondary fluid flow line 135 cross sectional flow area 155 associated with a secondary fluid flow rate 160, wherein the secondary fluid flow line cross sectional flow area 155 is less than the primary fluid flow line 100 cross sectional flow area 120 such that the secondary fluid flow rate 160 is less than the primary fluid flow rate 125, the secondary fluid flow line 135 long axis 140 being co-axial 165 to the longitudinal axis 85, see FIGS. 1, 2, 3, 4, and 5. The preferred cross section area 155 is about 0.19 inches squared based upon a ⅜" nominal schedule 40 pipe size with an internal diameter 140 of 0.493 inches and an outside diameter 157 of 0.675 inches, however, other pipe sizes could be employed as required, subject to the requirement that the secondary fluid flow line 135 cross sectional flow area 155 is less than the primary fluid flow line 100 cross sectional flow area 120, as given in the preferences above.

Yet further included in the fluid leak detection and shutdown apparatus 50 is a flow sensor 170 in fluid communication 175 with the secondary fluid flow line 135, the flow sensor 170 having a perceptible output 180, wherein the flow sensor 170 has a flow sensing flow rate capacity that is less than the solenoid shutoff valve 80 flow capacity, see FIGS. 1, 2, 5, and 6. Wherein operationally the flow sensor 170 receives a portion 185 of the solenoid shutoff valve 80 flow capacity in priority over the primary fluid flow line 100 that receives a remaining portion 190 of the solenoid shutoff valve 80 flow capacity, thus allowing the flow sensor 170 to detect minimal flow rates, see FIGS. 1, 2, 5, and 6. Plus also included in the fluid leak detection and shutdown apparatus 50 is a means 195 for activating the solenoid shutoff valve 80 based on the flow sensor 170 perceptible output 180, see FIGS. 1, 2, 5, 6, and 7. The flow sensor 170 is preferably manufactured by Raven Industries being model number 107651 that detects flow rates down to 0.33 gallons per minute, wherein the perceptible output 180 is preferably a magnetic flow switch.

In addition, the fluid leak detection and shutdown apparatus 50 can include a check valve 200 in fluid communication 205 with the primary fluid flow line 100, wherein the check valve 200 allows fluid flow 210 from the solenoid shutoff valve 80 to the fluid distribution system 55 outlet 70, see FIGS. 1, 2, and 5. Further the check valve 200 substantially preventing fluid flow 215 from the fluid distribution system 55 outlet 70 to the solenoid shutoff valve 80, wherein operationally the check valve 200 helps prevent fluid flow 220 from the primary fluid line 100 into the secondary fluid flow line 135, again see FIGS. 1, 2, and 5. The check valve 200 is preferably a NDS brand FLO Control model 1205-05 for ½" nominal pipe line size and having a 5 pound spring, or any suitable equivalent. The check valve 200 also can be operational to further help cause fluid flow 95 to divert first to the flow sensor 170, thus allowing the flow sensor 170 to pick up a smaller earlier leakage thus activating the perceptible output 180, prior to the check valve 200 opening against its 5 pound spring, wherein the fluid flow 95 will increase to fluid flow rate 60 as required by the fluid distribution system 55.

Further, on the fluid leak detection and shutdown apparatus 50 the means 195 for activating the solenoid shutoff valve 80 further includes a selectable time delay device 225 with a switch 230 that is in electrical communication 235 with the flow sensor 170 perceptible output 180 and the solenoid shutoff valve 80, looking in particular at FIGS. 1, 2, 5, 6, and 7. Wherein operationally, the selectable time delay device 225 when continuously actuated by the flow sensor 170 perceptible output 180 causes the solenoid shutoff valve 80 to stay in the open operational state for a selected time delay period, wherein the solenoid shutoff valve 80 is activated into the closed operational state at a conclusion of the selected time delay period via closing the switch 230, again see FIGS. 1, 2, 5, 6, and 7.

The selectable time delay device 225 is preferably a Omron model H3CR-A8 having a range of fractions of a second to 300 hours, or a suitable equivalent. Wherein the time setting 270 and 273 is determined from the article 75 cumulative time flow usage, typically in a low flow rate, as an example the articles 75 would include refrigerator ice makers, ice machines, chilled water dispensers, humidifiers, evaporative coolers, hot water heater make-up, and the like that will use small amounts of water on a temporary basis, and as such would give rise to the flow sensor 170 generating a perceptible output 180 for a short time period, thus the time setting 270 and 273 would account for these article 75 usages and not activate 285 the solenoid valve based upon article 75 usage, wherein activation 285 would only occur for a major fluid distribution system 55 leak, for instance while the home owner was away from their residence for an extended period, thus the activation 285 would prevent major water damage for an unexpected pipe or valve failure or the like that would be outside of these normal article 75 usages.

Also, on the fluid leak detection and shutdown apparatus 50 the time delay device 225 can further include a latching relay 240 having an energized operational state 245 and a de-energized operational state 250, wherein the latching relay 240 is operational to reduce an electrical power load on the time delay device 225 switch 230, as best seen in FIG. 6. Yet further, on the fluid leak detection and shutdown apparatus 50 the time delay device 225 can further include a selectable reset circuit 255 that has a normally open circuit operational state 260 and a selectable momentary closed circuit operational state 265, wherein operationally the selectable reset circuit 255 resets the latching relay 240 from the energized operational state 245 to the de-energized operational state 250, see FIGS. 5 and 6. The latching relay is preferably a Dayton model 1EHY2 or a suitable equivalent.

Method of Use

Looking at FIG. 7 in particular, and FIGS. 1, 2, 5, and 6 also, a method of using the fluid leak detection and shutdown apparatus 50 for the fluid distribution system 55 having a total fluid distribution system 55 flow rate 60, with the fluid distribution system 55 having the inlet 65 and an 70 outlet is disclosed. Wherein the outlet 70 has an article 75 that consumes a portion of the total fluid distribution system 55 flow rate 60. The method of using the fluid leak detection and shutdown apparatus 50 comprising the steps of firstly providing a fluid leak detection and shutdown apparatus 50 as previously described. Wherein operationally the selectable time delay device 225 when continuously actuated by the flow sensor 170 perceptible output 180 via closing the switch 230 causes the solenoid shutoff valve 80 to stay in the open operational state for a selected time delay period 270 and 273, wherein the solenoid shutoff valve 80 is activated into the closed operational state at a conclusion of the selected time delay period 270 and 273, and an electrical power supply 271 that is in electrical communication 272 with the flow sensor 170, the selectable time delay device 225, the latching relay 240, the selectable reset circuit 255, and the solenoid shutoff valve 80.

A next step of setting 270 and 273 the time delay period on the selectable time delay device 225, see FIGS. 2, 5, 6, and 7, with the time delay period based upon an allowable normal cumulative low fluid flow rate time period that is determined by fluid time period usage of the article 75, such that the fluid distribution system 55 shutdown via an actuation 285 of the solenoid shutoff valve 80 only occurs when a fluid distribution system 55 flow rate time period is greater than the allowable normal cumulative low or fluid flow rate 60 fluid flow rate time period. In other words when the time delay device 225 starts 275 based upon the flow sensor 170 perceptible output 180 occurring, moving to the step of comparing the time 280 of the article 75 consumption of the total fluid flow rate 60 being greater than the selected time delay period 270 and 273, after which then activating 285 the solenoid shutoff valve 80. The selected time delay period 270 and 273 is subject to a pause 290 if the article 75 consumption flow rate 60 has suspended or interrupted via a loss of perceptible output 180 from the flow sensor 170. Subsequent to the pause 290 period, which is of an indefinite duration, the time delay device 225 will re-start 300 when the perceptible output 180 resumes from the flow sensor 170, indicating article 75 flow rate 60 has resumed, wherein this would continue until the total article 75 consumption flow rate 60 cumulative time period has exceeded the selected time delay period 270 and 273.

As an additional step, for the method of using the fluid leak detection and shutdown apparatus 50 further comprising a step of resetting the latching relay 240 by selectively placing the reset circuit 255 into the momentary closed circuit operational state 265 to change the latching relay 240 from the energized operational state 245 to the de-energized operational state 250 after fluid flow shut off of the fluid distribution system 55 once the solenoid shutoff valve 80 is activated 285, thus returning the solenoid shutoff valve 80 to the open operational state, see FIGS. 1, 2, and 6.

CONCLUSION

Accordingly, the present invention of a fluid leak detection and shutdown apparatus 50 has been described with some degree of particularity directed to the embodiments of the present invention. It should be appreciated, though; that the present invention is defined by the following claims construed in light of the prior art so modifications or changes may be made to the exemplary embodiments of the present invention without departing from the inventive concepts contained therein.

The invention claimed is:

1. A fluid leak detection and shutdown apparatus for a fluid distribution system having a total fluid distribution system flow rate, said fluid distribution system having an inlet and an outlet, said fluid leak detection and shutdown apparatus comprising:

(a) a solenoid shutoff valve having a longitudinal axis, said solenoid shutoff valve having a flow capacity substantially matched to the total fluid distribution system flow rate, said solenoid shutoff valve is adapted to be in fluid communication downstream from the fluid distribution system inlet, said solenoid shutoff valve having an open operational state that allows fluid flow therethrough and a closed operational state that substantially precludes fluid flow therethrough, said solenoid shutoff valve having a default position of being in said open operational state and said solenoid shutoff valve having an activated position of being in said closed operational state;

b) a primary fluid flow line having multiple lengthwise axes, said primary fluid flow line is in downstream fluid communication with said solenoid shutoff valve, said primary fluid flow line also being in upstream fluid communication with the fluid distribution system outlet, said primary fluid flow line having a primary fluid flow line cross sectional flow area associated with a primary fluid flow rate, said multiple lengthwise axes being elevated above and substantially perpendicular to said longitudinal axis, said multiple lengthwise axes having at least four (4) right angle intersections that are operational to require at least four (4) right angle turns of said primary fluid flow rate to add a restriction to said primary fluid flow rate, further one of said multiple lengthwise axes elevated above said longitudinal axis adds restriction to said primary fluid flow rate;

(c) a secondary fluid flow line having a long axis, said secondary fluid flow line is in downstream fluid communication with said solenoid shutoff valve, said secondary fluid flow line also being in upstream fluid communication with the fluid distribution system outlet, said secondary fluid flow line having a secondary fluid flow line cross sectional flow area associated with a secondary fluid flow rate, wherein said secondary fluid flow line cross sectional flow area is less than said primary fluid flow line cross sectional flow area such that said secondary fluid flow rate is less than said primary fluid flow rate, said secondary fluid flow line long axis being coaxial to said longitudinal axis to structurally provide a direct line of sight flow path for said secondary fluid flow rate from said solenoid shutoff valve therethrough said secondary fluid flow line to said secondary fluid flow line upstream fluid communication to the fluid distribution system outlet to operationally minimize restriction to said secondary fluid flow rate thus to bias a fluid flow from said solenoid shutoff valve to be said secondary fluid flow rate;
(d) a flow sensor in fluid communication with said secondary fluid flow line, said flow sensor having a perceptible output, wherein said flow sensor has a flow sensing flow rate capacity that is less than said solenoid shutoff flow capacity, wherein operationally said flow sensor receives a portion of said solenoid shutoff valve flow capacity in priority over said primary fluid flow line receiving a remaining portion of said solenoid shutoff valve flow capacity, thus allowing said flow sensor to detect minimal flow rates; and
(e) a means for activating said solenoid shutoff valve based on said flow sensor perceptible output.

2. A fluid leak detection and shutdown apparatus according to claim 1 further including a check valve in fluid communication with said primary fluid flow line, wherein said check valve allows fluid flow from said solenoid shutoff valve to the fluid distribution system outlet and said check valve substantially preventing fluid flow from the fluid distribution system outlet to said solenoid shutoff valve, wherein operationally said check valve helps prevent fluid flow from said primary fluid line into said secondary fluid flow line.

3. A fluid leak detection and shutdown apparatus according to claim 2 wherein said means for activating said solenoid shutoff valve further includes a selectable time delay device with a switch that is in electrical communication with said flow sensor perceptible output and said solenoid shutoff valve, wherein operationally said selectable time delay device when continuously actuated by said flow sensor perceptible output causes said solenoid shutoff valve to stay in said open operational state for a selected time delay period, wherein said solenoid shutoff valve is activated into said closed operational state at a conclusion of said selected time delay period via closing said switch.

4. A fluid leak detection and shutdown apparatus according to claim 3, wherein said time delay device further includes a latching relay having an energized operational state and a de-energized operational state, wherein said latching relay is operational to reduce an electrical power load on said time delay device switch.

5. A fluid leak detection and shutdown apparatus according to claim 4, wherein said time delay device further includes a selectable reset circuit that has a normally open circuit operational state and a selectable momentary closed circuit operational state, wherein operationally said selectable reset circuit resets said latching relay from said energized operational state to said de-energized operational state.

* * * * *